(12) United States Patent
Kim et al.

(10) Patent No.: US 12,275,868 B2
(45) Date of Patent: Apr. 15, 2025

(54) SURFACE PROTECTION FILM

(71) Applicant: LG CHEM, LTD., Seoul (KR)

(72) Inventors: So Jin Kim, Daejeon (KR); Hyun Cheol Kim, Daejeon (KR); Jeong Min Choi, Daejeon (KR); Sang Hwan Kim, Daejeon (KR); Kwang Su Seo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 663 days.

(21) Appl. No.: 17/628,512

(22) PCT Filed: Nov. 20, 2020

(86) PCT No.: PCT/KR2020/016506
§ 371 (c)(1),
(2) Date: Jan. 19, 2022

(87) PCT Pub. No.: WO2021/101332
PCT Pub. Date: May 27, 2021

(65) Prior Publication Data
US 2022/0275260 A1 Sep. 1, 2022

(30) Foreign Application Priority Data
Nov. 21, 2019 (KR) .................. 10-2019-0150453

(51) Int. Cl.
| | | |
|---|---|---|
| C09J 175/04 | (2006.01) | |
| C09J 7/20 | (2018.01) | |
| C09J 7/30 | (2018.01) | |
| C09J 7/50 | (2018.01) | |
| C09J 11/06 | (2006.01) | |

(52) U.S. Cl.
CPC ............. *C09J 175/04* (2013.01); *C09J 7/20* (2018.01); *C09J 7/30* (2018.01); *C09J 7/50* (2018.01); *C09J 11/06* (2013.01); *C09J 2301/122* (2020.08); *C09J 2301/312* (2020.08)

(58) Field of Classification Search
None
See application file for complete search history.

(56) References Cited

U.S. PATENT DOCUMENTS 11,781,040 B2 * 10/2023 Kim .............. C09J 183/06
428/41.4
2020/0324527 A1 * 10/2020 Klun .............. B32B 27/365

FOREIGN PATENT DOCUMENTS

| CN | 110114434 A | 8/2019 | |
|---|---|---|---|
| JP | 2009-79113 A | 4/2009 | |
| JP | 2012039053 A | 2/2012 | |
| JP | 2012-197426 A | 10/2012 | |
| JP | 2013-189545 A | 9/2013 | |
| JP | 2014196383 A | 10/2014 | |
| JP | 2018076456 A | 5/2018 | |
| JP | 2018-109092 A | 7/2018 | |
| KR | 10-2000-0021803 A | 4/2000 | |
| KR | 10-2000-0021804 A | 4/2000 | |
| KR | 10-2018-0090735 A | 8/2018 | |
| KR | 10-2018-0124305 A | 11/2018 | |
| KR | 10-2019-0025190 A | 3/2019 | |
| KR | 10-2019-0026584 A | 3/2019 | |
| TW | 201920569 A | 6/2019 | |
| WO | WO-2019116188 A1 * | 6/2019 | ............. B32B 27/08 |

OTHER PUBLICATIONS

KR-20120055803-A; English Machine Translation (Year: 2012).*
KR-20190026584-A; English Machine Translation (Year: 2019).*

* cited by examiner

Primary Examiner — Michael J Feely
Assistant Examiner — Holley Grace Hester
(74) Attorney, Agent, or Firm — Ricky Lam

(57) ABSTRACT

The present disclosure provides a surface protective film which is used in a process of fabricating an encapsulation layer for an organic light-emitting diode, and makes it possible to prevent bubbles from being generated in the protective film or the surface smoothness of the protective film from being degraded, due to solvent volatilization from the protective film. Specifically, the present disclosure provides a surface protective film including an adhesive layer provided on one surface of a substrate layer, wherein the adhesive layer includes a cured product of an adhesive composition including: a urethane-based resin having a photoreactive group at the end or side chain thereof; a monofunctional (meth)acrylate monomer; a crosslinking agent having two or more photoreactive groups at the end thereof; a photoinitiator; and a photoreactive siloxane additive, the adhesive composition being solvent-free.

13 Claims, No Drawings

SURFACE PROTECTION FILM

The present application is a National Phase entry pursuant to 35 U.S.C. § 371 of International Application No. PCT/KR2020/016506 filed Nov. 20, 2020, and claims priority to and the benefit of the filing date of Korean Patent Application No. 10-2019-0150453, filed on Nov. 21, 2019, in the Korean Intellectual Property Office, the disclosures of which are incorporated herein in its entirety by reference.

FIELD

The present disclosure relates to a surface protective film, and more particularly, to a surface protective film having reduced peel strength and an improved adhesive strength retention rate, which are physical properties required for a surface protective film for an optical member, by including a photoreactive siloxane additive in an adhesive layer thereof.

BACKGROUND

An organic light-emitting diode (OLED), a self-luminous display device, does not require a separate light source, unlike a liquid crystal display (LCD), and thus may be fabricated in a lightweight and thin form. In addition, the organic light-emitting diode is not only advantageous in terms of power consumption due to low voltage driving, but also has excellent response speed, viewing angle, and contrast ratio, and thus has been studied as a next-generation display.

The organic light-emitting diode has problems in that it is highly vulnerable to impurities, oxygen and moisture, and thus when it is exposed to the outside or moisture or oxygen penetrates therein, its characteristics are likely to deteriorate and the lifetime thereof is shortened. In order to overcome these problems, an encapsulation layer for preventing oxygen, moisture and the like from entering the interior of the organic light-emitting device is required.

The encapsulation layer includes a protective film for protecting the encapsulation layer during or after the fabrication process. The protective film is removed after lamination with the encapsulation layer, and needs to have low peel strength and a high adhesive strength retention rate, because there should be no damage to and residue on the encapsulation layer after removal of the protective film. In addition, the protective film is generally fabricated using a solvent, and has problems in that bubbles are generated in the protective film, or the surface smoothness of the protective film is degraded, in the process of volatilizing the solvent.

SUMMARY

An object to be achieved by the present disclosure is to provide a surface protective film which is used in a process of fabricating an encapsulation layer for an organic light-emitting diode, makes it possible to suppress bubbles from being generated in the protective film, or the surface smoothness of the protective film from being degraded, due to solvent volatilization from the protective film, and has reduced peel strength while having an improved adhesive strength retention rate.

However, the objects to be solved by the present disclosure are not limited to the above-mentioned object, and other objects which are not mentioned herein will be clearly understood by those skilled in the art from the following description.

One embodiment of the present disclosure provides a surface protective film including an adhesive layer provided on one surface of a substrate layer, wherein the adhesive layer includes a cured product of an adhesive composition including: a urethane-based resin having a photoreactive group at the end or side chain thereof; a monofunctional (meth)acrylate monomer; a crosslinking agent having two or more photoreactive groups at the end thereof; a photoinitiator; and a photoreactive siloxane additive, the adhesive composition being solvent-free.

The surface protective film according to one embodiment of the present disclosure is fabricated without using a solvent, and thus does not require a process of volatizing the solvent, thus making it possible to prevent bubbles from being generated in the protective film, or the surface smoothness of the surface protective film from being degraded, due to solvent volatilization from the protective film. Furthermore, the surface protective film is fabricated using a urethane resin which is photocurable, thus improving productivity.

In addition, the surface protective film according to one embodiment of the present disclosure has reduced peel strength and an improved adhesive strength retention rate, thus improving the workability of a process of fabricating an encapsulation layer for an organic light-emitting diode.

DETAILED DESCRIPTION

The terms and words used in the present specification and the appended claims should not be interpreted as being limited to typical meanings or dictionary definitions, but should be interpreted as having meanings and concepts relevant to the technical spirit of the present disclosure based on the rule according to which the inventors can appropriately define the meaning of the terms to describe their invention in the best manner. Accordingly, it should be understood that the embodiments described in the present specification are merely preferred examples, but do not cover all the technical spirit of the present disclosure, and thus there may be various equivalents and modifications capable of replacing them at the time of filing the present application.

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

Throughout the present specification, the unit "parts by weight" may refer to the ratio of weight between components.

Throughout the present specification, the term "(meth)acrylate" is meant to include all acrylate and methacrylate.

Throughout the present specification, "A and/or B" refers to "A and B" or "A or B".

Throughout the present specification, the term "monomer unit" may mean the reacted form of a monomer in a polymer, and specifically may mean a state in which the monomer forms the backbone of the polymer, for example, a main chain or a side chain, through a polymerization reaction.

Throughout the present specification, the "weight-average molecular weight" and "number-average molecular weight" of any compound may be calculated using the molecular weight and molecular weight distribution of the compound.

Specifically, the molecular weight and molecular weight distribution of the compound may be obtained by: placing tetrahydrofuran (THF) and the compound in a 1-ml glass vial to prepare a test sample in which the concentration of the compound is 1 wt %; filtering a standard sample (polystyrene) and the test sample through a filter (pore size: 0.45 µm); injecting each of the sample filtrates into a GPC injector; and comparing the elution time of the test sample with a calibration curve of the standard sample. At this time, Infinity II 1260 (Agilent Technologies, Inc.) may be used as a measurement instrument, and the flow rate and the column temperature may be set at 1.00 mL/min and 40.0° C., respectively.

Hereinafter, the present disclosure will be described in more detail.

A surface protective film which is used to protect an encapsulation layer in a process of fabricating an organic light-emitting diode is required to have low peel strength in order to prevent damage to and leaving residue on the encapsulation layer. A conventional protective film is generally fabricated using a solvent, and has a problem in that bubbles are generated in the protective film, or the surface smoothness of the protective film is degraded, in a process of volatilizing the solvent. Furthermore, when an additive is added to the conventional protective film in order to lower the peel strength of the protective film, the peel strength is lowered, but a problem arises in that the retention rate of the adhesive strength is lowered, and thus adhesive leaves residue on an adherend after peeling.

One embodiment of the present disclosure provides a surface protective film including an adhesive layer provided on one surface of a substrate layer, wherein the adhesive layer includes a cured product of an adhesive composition including: a urethane-based resin having a photoreactive group at the end or side chain thereof; a monofunctional (meth)acrylate monomer; a crosslinking agent having two or more photoreactive groups at the end thereof; a photoinitiator; and a photoreactive siloxane additive, the adhesive composition being solvent-free. The present disclosure does not use a solvent, and thus does not require a process of volatilizing the solvent, thus making it possible to prevent bubbles from being generated in the protective film, or the surface smoothness of the protective film from being degraded. In addition, the present disclosure may reduce the peel strength of the surface protective film and improve the adhesive strength retention rate thereof, thus improving productivity.

According to one embodiment of the present disclosure, there is provided a surface protective film in which the adhesive layer has a peel strength of 0.5 gf/in to 4 gf/in, as measured on a glass substrate at a peel angle of 180° and a peel rate of 1.8 m/min, and the adhesive strength retention rate of the adhesive layer is 75% or more. The present disclosure does not use a solvent, and thus does not require a process of volatilizing the solvent, thus making it possible to prevent bubbles from being generated in the protective film, or the surface smoothness of the protective film from being degraded. In addition, the present disclosure may reduce the peel strength of the surface protective film and improve the adhesive strength retention rate thereof, thus improving productivity.

In the present disclosure, the "peel strength" measured on a glass substrate at a peel angle of 180° and a peel rate of 1.8 m/min is a peel strength obtained by cutting a surface protective film to a size of 25 mm in width and 150 mm in length, attaching the adhesive layer of the cut surface protective film to a glass substrate by means of a 2-kg roller, storing the resultant at 25° C. for 24 hours, and then measuring the peel strength while peeling the surface protective film from the glass substrate at a peel rate of 1.8 m/min and a peel angle of 180° using a Texture Analyzer (Stable Micro System, UK).

In the present disclosure, unless otherwise specified, the term "glass" may refer to alkali-free glass (OA-21, NEG).

According to one embodiment of the present disclosure, the peel strength may be 0.5 gf/in to 4 gf/in. Specifically, the peel strength may be 0.6 gf/in to 3.9 gf/in, 0.7 gf/in to 3.8 gf/in, 0.8 gf/in to 3.7 gf/in, 0.9 gf/in to 3.6 gf/in, 1.0 gf/in to 3.5 gf/in, 1.1 gf/in to 3.4 gf/in, 1.5 gf/in to 3.0 gf/in, 1.8 gf/in to 2.7 gf/in, or 2.0 gf/in to 2.5 gf/in. That is, by achieving a low peel strength within the above-described range, it is possible to improve the workability of a process of fabricating an OLED.

According to one embodiment of the present disclosure, the adhesive strength retention rate of the adhesive layer may be 75% or more. Specifically, the adhesive strength retention rate of the adhesive layer may be 75% to 99%, 77% to 95%, 80% to 90%, or 82% to 86%. By adjusting the adhesive strength retention rate within the above-described range, it is possible to reduce the amount of the adhesive remaining on an adherend after peeling.

According to one embodiment of the present disclosure, the photoreactive group in the urethane-based resin having the photoreactive group at the end or side chain thereof may be capped with a hydroxyl group-containing monofunctional acrylate. Where the urethane-based resin in which the photoreactive group is capped with the hydroxyl group-containing monofunctional acrylate as described above is used, the photocuring reaction thereof may be efficiently performed.

According to one embodiment of the present disclosure, the urethane-based resin may be produced by reacting a urethane composition containing a polyol(s) and an isocyanate-based curing agent.

According to one embodiment of the present disclosure, the polyol contained in the urethane composition may be any appropriate polyol containing two or more OH groups. In one embodiment, the polyol may contain, but is not limited to, 2 to 6 OH groups.

According to one embodiment of the present disclosure, one, two or more polyols may be contained in the urethane composition. Where two or more polyols are contained, the mixing ratio thereof may be appropriately selected.

According to one embodiment of the present disclosure, the number-average molecular weight of the polyol contained in the urethane composition may be appropriately selected. Specifically, the number-average molecular weight of the polyol is preferably 100 g/mol to 20,000 g/mol, but is not limited thereto.

According to one embodiment of the present disclosure, the polyols contained in the urethane composition may include a bifunctional polyol and a trifunctional polyol. Specifically, among the polyols contained in the urethane composition, the proportion of a trifunctional polyol may be 70 wt % to 100 wt %, 80 wt % to 100 wt %, or 90 wt % to 100 wt %, and the proportion of the bifunctional polyol may be 0 wt % to 30 wt %, 0 wt % to 20 wt %, or 0 wt % to 10 wt %. More specifically, where the polyols include a trifunctional polyol, a balance between the adhesive strength and the re-peelability of the adhesive layer is advantageously achieved.

According to one embodiment of the present disclosure, where the urethane composition contains a trifunctional polyol, the trifunctional polyol may be composed of a polyol having a number-average molecular weight of 10,000 g/mol to 15,000 g/mol and a polyol having a number-average molecular weight of 1,000 g/mol to 5,000 g/mol.

According to one embodiment of the present disclosure, where the urethane composition contains a bifunctional polyol, the bifunctional polyol may have a number-average molecular weight of 100 g/mol to 3,000 g/mol.

According to one embodiment of the present disclosure, the polyol contained in the urethane composition preferably does not contain an additional functional group which is reactive with an isocyanate group (NCO).

According to one embodiment of the present disclosure, examples of the polyol contained in the urethane composition include, but are not limited to, polyacrylic polyol, polyether polyol, polyester polyol, polycaprolactone polyol, polycarbonate polyol, castor oil-based polyol, and combinations thereof. More specifically, the polyol may be one selected from the group consisting of ethylene glycol, diethylene glycol, polypropylene glycol, and combinations thereof.

According to one embodiment of the present disclosure, where two or more polyols are used in combination, the degree of dispersion of the molecular weights thereof is easily adjusted. In one embodiment, the polyol includes 50 wt % to 100 wt % of polyether polyol and 0 wt % to 50 wt % of polyester polyol. Specifically, the polyol includes 75 wt % to 95 wt % of polyether polyol and 5 wt % to 25 wt % of polyester polyol.

According to one embodiment of the present disclosure, as the isocyanate-based curing agent contained in the urethane composition, any appropriate polyfunctional isocyanate compound which may be used in a urethane-forming reaction and is commonly used in the art may be selected and used.

According to one embodiment of the present disclosure, examples of the polyfunctional isocyanate compound include, but are not limited to, polyfunctional aliphatic isocyanate compounds, polyfunctional alicyclic isocyanate compounds, polyfunctional aromatic isocyanate compounds, a trimethylolpropane adduct obtained by modifying a polyisocyanate with a trifunctional isocyanate, a biuret body obtained by reacting a polyisocyanate with water, and trimers having an isocyanurate ring.

According to one embodiment of the present disclosure, examples of the polyfunctional aliphatic isocyanate compounds include, but are not limited to, trimethylene diisocyanate, tetramethylene diisocyanate, pentamethylene diisocyanate, hexamethylene diisocyanate, 1,2-propylene diisocyanate, 1,3-butylene diisocyanate, dodecamethylene diisocyanate, 2,4,4-trimethylhexamethylene diisocyanate, and the like.

According to one embodiment of the present disclosure, examples of the polyfunctional alicyclic isocyanate compounds include, but are not limited to, isophorone diisocyanate (IPDI), 1,4-cyclohexane diisocyanate (CHDI), 4,4'-dicyclohexylmethane diisocyanate (HMDI), bis(isocyanatomethyl) cyclohexane (HXDI), and the like.

According to one embodiment of the present disclosure, examples of the polyfunctional aromatic isocyanate compounds include, but are not limited to, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PDI), m-phenylene diisocyanate (PDI), naphthalene 1,5-diisocyanate (NDI), naphthalene 2,4-diisocyanate (NDI), p-xylylene diisocyanate (XDI), 1,3-bis(1-isocyanato-1-methylethyl)benzene (TMXDI), and the like.

In one embodiment of the present disclosure, the urethane composition may contain a combination of two or more isocyanate-based curing agents. In this case, the types and contents of the two or more isocyanate-based curing agents may be appropriately selected. For example, as the isocyanate-based compound contained in the urethane composition, a polyfunctional aromatic isocyanate compound and a polyfunctional aliphatic isocyanate compound may be used in combination.

According to one embodiment of the present disclosure, the mixing ratio between the polyol and the isocyanate-based curing agent in the urethane composition may be appropriately selected.

According to one embodiment of the present disclosure, the urethane composition may further contain other components within a range that does not impair the effect of the present disclosure. For example, the composition may further contain a catalyst, a plasticizer, an antioxidant, a leveling agent, a solvent, and the like.

According to one embodiment of the present disclosure, as a polymerization method for producing the urethane-based resin, any appropriate known method may be selected. In one embodiment, a method such as solution polymerization may be used.

In one embodiment of the present disclosure, the monofunctional (meth)acrylate monomer may be an alkyl (meth)acrylate monomer having 10 or more carbon atoms. The monofunctional (meth)acrylate monomer imparts hydrophobic properties to the adhesive layer. In particular, when the alkyl group of the monofunctional (meth)acrylate has 10 or more carbon atoms, the monofunctional (meth)acrylate exhibits high hydrophobic properties, and thus exhibits a great effect of reducing the adhesion of the adhesive layer to an adherend.

According to one embodiment of the present disclosure, examples of the monofunctional (meth)acrylate monomer include: methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate, and tetradecyl (meth)acrylate, and one or a mixture of two or more selected from among the above-described monomers may be included in the adhesive layer.

In one embodiment of the present disclosure, the monofunctional (meth)acrylate monomer may be contained in an amount of 50 parts by weight to 200 parts by weight based on 100 parts by weight of the urethane-based resin. By adjusting the content of the monofunctional (meth)acrylate monomer within the above-described range, it is possible to improve the compatibility thereof with the urethane-based resin.

According to one embodiment of the present disclosure, the photoreactive siloxane additive is of a solvent-free type and may contain an acrylate reactive group. Where the photoreactive siloxane additive described above is contained in the adhesive composition, it is possible to reduce the peel strength of the surface protective film while improving the adhesive strength retention rate thereof, and since photoreactive siloxane additive is solvent-free, it may prevent environmental pollution and prevent bubbles or the like from being generated in the adhesive layer.

According to one embodiment of the present disclosure, the photoreactive siloxane additive may be contained in an amount of 0.01 parts by weight to 1 part by weight based on 100 parts by weight of the urethane-based resin. Specifically, the photoreactive siloxane additive may be contained in an amount of 0.01 parts by weight to 1 part by weight, 0.05 parts by weight to 0.7 parts by weight, or 0.1 parts by weight to 0.5 parts by weight, based on 100 parts by weight of the urethane-based resin. By adjusting the content of the photoreactive siloxane additive within the above-described range, it is possible to reduce the peel strength of the surface protective film while improving the adhesive strength retention rate thereof.

According to one embodiment of the present disclosure, the crosslinking agent having two or more photoreactive groups at the end thereof may be one selected from the group consisting of a polyfunctional (meth)acrylate monomer, a polyfunctional urethane (meth)acrylate oligomer, and a mixture thereof. Specifically, the crosslinking agent may be preferably a photocurable polyfunctional (meth)acrylate. Examples of the polyfunctional (meth)acrylate include, but are not limited to, bifunctional acrylates such as 1,4-butanediol di(meth)acrylate, 1,6-hexanediol di(meth) acrylate, neopentylglycol di(meth)acrylate, polyethyleneglycol di(meth)acrylate, neopentylglycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxy ethyl isocyanurate, allylated cyclohexyl di(meth)acrylate, tricyclodecanedimethanol (meth)acrylate, dimethylol dicyclopentanedi(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate or 9,9-bis[4-(2-acryloyloxyethoxy)phenyl]fluorene; trifunctional acrylates such as trimethylolpropane tri(meth)acrylate, dipentaerythritol tri (meth)acrylate, propionic acid-modified dipentaerythritol tri (meth)acrylate, pentaerythritol tri(meth)acrylate, propylene oxide-modified trimethylolpropane tri(meth)acrylate, trifunctional urethane (meth)acrylate or tris(meth)acryloxyethyl isocyanurate; tetrafunctional acrylates such as diglycerin tetra(meth)acrylate or pentaerythritol tetra(meth) acrylate; pentafunctional acrylates such as dipentaerythritol penta(meth)acrylate; and hexafunctional acrylates such as dipentaerythritol hexa(meth)acrylate, caprolactone-modified dipentaerythritol hexa(meth)acrylate, or urethane (meth)acrylates (for example, reaction products of an isocyanate monomer and trimethylolpropane tri(meth)acrylate).

According to one embodiment of the present disclosure, the crosslinking agent may be contained in an amount of 5 parts by weight to 50 parts by weight based on 100 parts by weight of the urethane-based resin. Specifically, the crosslinking agent may be contained in an amount of 10 parts by weight to 45 parts by weight, 15 parts by weight to 40 parts by weight, or 20 parts by weight to 35 parts by weight, based on 100 parts by weight of the urethane-based resin. By adjusting the content of the crosslinking agent within the above-described range, it is possible to satisfy the mechanical properties required for the adhesive layer.

According to one embodiment of the present disclosure, the photoinitiator may be an alpha-hydroxy ketone type compound, a benzyl ketal type compound, or a mixture thereof, but is not limited thereto. Preferably, the alpha-hydroxy ketone type compound may be used, such as 1-hydroxy-cyclohexyl-phenyl-ketone, 2-hydroxy 2-methyl-1-phenyl-1-propanone, 2-hydroxy-1-[4-(2-hydroxyethoxy) phenyl]-2-methyl-1-propanone, 2,2-dimethoxy-2-phenylacetophenone, or 2,4,6-trimethylbenzoyl-diphenyl phosphine oxide. These photoinitiators may be used alone or in combination of two or more. The photoinitiator may be contained in an amount of 0.1 parts by weight to 5 parts by weight based on 100 parts by weight of the total sum of the urethane-based resin, the crosslinking agent and the photoreactive siloxane additive. Where the photoinitiator is used as described above, it may be activated by UV light or an electron beam to activate a carbon-carbon double bond in the adhesive layer, causing a radical reaction.

According to one embodiment of the present disclosure, the adhesive layer may further include an antistatic agent. Where the adhesive composition included in the adhesive layer further contains the antistatic agent as described above and is cured, it is possible to prevent static electricity from occurring in the surface protective film.

According to one embodiment of the present disclosure, the thickness of the adhesive layer may be appropriately selected in consideration of the purpose of the present disclosure. For example, the thickness of the adhesive layer may be 10 μm to 200 μm, preferably 10 μm to 150 μm, more preferably 10 μm to 100 μm. By setting the thickness of the adhesive layer within the above range, it is possible to provide an adhesive layer having excellent adhesive and wetting properties while being applicable to a protective film for a process.

The adhesive layer may be formed by curing an adhesive composition on the substrate layer, but the method of forming the adhesive layer is not particularly limited. In one embodiment, the adhesive layer may be fabricated, for example, by a method in which the above-described adhesive composition or a coating solution prepared using the same is applied to a substrate layer by a conventional means such as an applicator coating device or a bar coater and cured.

Meanwhile, according to one embodiment of the present disclosure, there may be provided a surface protective film wherein the substrate layer includes: a substrate film; and a first antistatic layer and a second antistatic layer provided on both surfaces of the substrate film, respectively, and the adhesive layer is provided on a surface of the second antistatic layer, which is opposite to a surface thereof on which the substrate film is provided.

The type of the substrate film is not particularly limited. The substrate film may be, for example, a polyethylene terephthalate film, a polytetrafluoroethylene film, a polyethylene film, a polypropylene film, a polybutene film, a polybutadiene film, a vinyl chloride copolymer film, a polyurethane film, an ethylene-vinyl acetate film, an ethylene-propylene copolymer film, an ethylene-ethyl acrylate copolymer film, an ethylene-methyl acrylate copolymer film, or a polyimide film, but is not limited thereto. In one embodiment of the present disclosure, the substrate film may be a polyethylene terephthalate (PET) film.

The thickness of the substrate film may be, for example, 10 μm to 150 μm, 50 μm to 125 μm, or 50 μm to 100 μm. When laminating the substrate layer having an adhesive layer formed thereon onto an encapsulation layer for an organic light-emitting diode, if the thickness of the substrate film is smaller than the lower limit of the above range, the substrate film may be likely to be deformed, and if the thickness of the substrate film is larger than the upper limit of the above range, lamination failure may occur.

The substrate film may be subjected to suitable adhering treatment such as corona discharge treatment, UV irradiation treatment, plasma treatment or sputter etching treatment, but is not limited thereto.

In the present specification, the term "antistatic layer" refers to a layer that serves to suppress the generation of static electricity.

The first and second antistatic layers may be formed by a known method in order to achieve a desired effect. For example, the first and second antistatic layers may be formed on both surfaces of the substrate film and both surfaces of the protective film by an in-line coating method.

In the present disclosure, the first and second antistatic layers may be formed of an appropriate antistatic composition in consideration of the purpose of the present disclosure. For example, the first and second antistatic layers may include, but are not limited to, one or a mixture of two or more selected from the group consisting of acrylic resins, urethane-based resins, urethane-acrylic copolymers, ester-based resins, ether-based resins, amide-based resins, epoxy-based resins, and melamine resins.

In one example, the first and second antistatic layers may include an electrically conductive material. The electrically conductive material may include an electrically conductive polymer or carbon nanotubes, but is not limited thereto.

Examples of the electrically conductive polymer include, but are not limited to, polyanilines, polypyrroles, polythiophenes, derivatives thereof, and copolymers thereof.

Carbon nanotubes may have a tube shape formed by rolling up a graphite sheet composed of connected hexagonal rings consisting of six carbon atoms. Carbon nanotubes have excellent rigidity and electrical conductivity, and thus when they are used as the antistatic layers for the surface protective film, the hardness of the antistatic layers may increase and the antistatic function thereof may be improved.

The thicknesses of the first and second antistatic layers may be appropriately selected in consideration of the purpose of the present disclosure, and the thicknesses of the antistatic layers may be the same as or different from each other.

In one embodiment, the thicknesses of the first and second antistatic layers may be each independently 10 nm to 400 nm, preferably 20 nm to 300 nm, or 20 nm to 100 nm. Where the first and second antistatic layers have thicknesses within the above-described range, they may have excellent coating properties on both surfaces of the substrate film or both surfaces of the protective film.

In one embodiment, the surface resistivities of the first and second antistatic layers may be appropriately selected in consideration of the purpose of the present disclosure. For example, the surface resistivities of the first and second antistatic layers are each independently $10^4$ Ω/sq or more, $10^3$ Ω/sq or more, $10^6$ Ω/sq or more, $10^7$ Ω/sq or more, $10^8$ Ω/sq or more, or $10^9$ Ω/sq or more. For example, the surface resistivities of the first and second antistatic layers may be each independently $5 \times 10^{12}$ Ω/sq or less, or $10^{11}$ Ω/sq or less. Where the first and second antistatic layers have surface resistivities within the above-described range, the surface protective film may have an excellent antistatic function.

As the adhesive layer according to one embodiment is provided in contact with one surface of the second antistatic layer, the amount of accumulated static electricity thereof may decrease. In addition, since the surface resistivity of the adhesive layer decreases, generation of static electricity on the surface of the adhesive layer when peeling the protective layer from the surface protective film decreases.

Thus, in a process of removing the protective layer from the surface protective film so as to attach the adhesive layer to the surface of an adherend, or in a process of peeling the surface protective film from the surface of the adherend, it is possible to prevent foreign matter from adhering to the adhesive layer or the adherend by static electricity. In addition, it is possible to prevent deterioration of the properties of the adherend surface by preventing contamination of the adherend surface during the process.

The thickness of the surface protective film may be appropriately selected in consideration of the purpose of the present disclosure. For example, the thickness of the surface protective film may be 25 μm to 150 μm, 25 μm to 125 μm, or 25 μm to 100 μm. If the thickness of the protective film is smaller than the lower limit of the above range, the surface protective film may be likely to be deformed when laminating the surface protective film having the adhesive layer formed thereon onto an encapsulation layer for an organic light-emitting diode, and if the thickness of the surface protective film is larger than the upper limit of the above range, lamination failure may occur.

EXAMPLES

Hereinafter, the present disclosure will be described in detail with reference to examples. However, the examples according to the present disclosure may be modified into various different forms, and the scope of the present disclosure is not construed as being limited to the examples described below. The examples in the present specification are provided to more completely describe the present disclosure to those skilled in the art.

PREPARATION EXAMPLES: PREPARATION OF ADHESIVE COMPOSITION AND PROTECTIVE FILM

Example 1

(1) Preparation of Adhesive Composition

A 5-neck glass reactor equipped with a reflux condenser was prepared, and then 764 g of the bifunctional polyol SC-2204 (Mn-2,000 g/mol, KPX Chemical Co., Ltd.) and 110 g of dicyclohexylmethylene diisocyanate (H12MDI, Evonik) were placed therein, and then 300 g of 2-ethylhexyl acrylate (2-EHA, LG Chem.) and 300 g of lauryl acrylate (M120, Miwon Specialty Chemical Co., Ltd.) were sequentially added thereto. After completion of the addition, the mixture was heated to and kept at 70° C. to become a homogeneous phase while it was stirred at a speed of 100 rpm. At the same temperature, 50 ppm of dibutyltin dilaurate (DBTDL) was added to the mixture to induce an NCO prepolymer-forming reaction, and the mixture was kept at 78° C. to 82° C. for 3 hours.

Thereafter, 26 g of 2-hydroxyethyl acrylate (2-HEA, Nippon Shokubai Co., Ltd.) was added to the mixture which was then allowed to react at 80° C. for 3 hours until the FT-IR NCO peak (2,260 cm$^{-1}$) disappeared, thereby producing an end-acrylated urethane-based resin. The urethane-based resin was produced to have a weight-average molecular weight of 87,500 g/mol, a molecular weight distribution of 2.63, and an oligomer viscosity of 169,000 cPs as measured at 25° C. using Brookfield DV II spindle No. 52.

100 parts by weight of the produced urethane-based resin, 135 parts by weight of 2-ethylhexyl acrylate (2-EHA), 12 parts by weight of trimethylolpropane triacrylate (TMPTA) and 25 parts by weight of 1,6-hexanediol diacrylate as a crosslinking agent, 156 parts by weight of acetylbutyl citrate (ATBC) as a plasticizer, and 0.5 parts by weight of a photoreactive siloxane additive (UV3500) were mixed together to prepare a mixture. 2 parts by weight of a photoinitiator (Irgacure 184) was added to 100 parts by weight of the mixture, thus preparing an adhesive composition.

(2) Fabrication of Surface Protective Film

As a substrate layer, a 75-μm-thick polyethylene terephthalate (PET) substrate film (H330, Kolon Inc.) whose both surfaces were coated with 50-nm-thick antistatic layers, respectively, was prepared. As a protective layer, a film (12ASW, SKC) was prepared, in which antistatic layers were formed on both surfaces of a 50-μm-thick polyethylene terephthalate (PET) film (XD510P, TAK) and one of the antistatic layers was coated with a release layer. Next, an excessive amount of the adhesive composition was applied onto one surface of the substrate layer, and then the substrate layer and the release layer were laminated to face each other, and coating was performed so that the thickness of the adhesive composition between the substrate layer and the release layer became 75 μm. The applied adhesive composition was photocured using a light source (black light) under light energy of 700 mJ/cm$^2$, thereby fabricating a surface protective film.

Example 2

An adhesive composition was prepared in the same manner as in Example 1, except that 0.2 parts by weight of the photoreactive siloxane additive (UV3500) was used instead of 0.5 parts by weight of the photoreactive siloxane additive (UV3500). Using the prepared adhesive composition, a surface protective film was fabricated.

Example 3

An adhesive composition was prepared in the same manner as in Example 1, except that 0.1 parts by weight of UV3530 was used instead of 0.5 parts by weight of UV3500 as the photoreactive siloxane additive. Using the prepared adhesive composition, a surface protective film was fabricated.

Example 4

An adhesive composition was prepared in the same manner as in Example 1, except that 0.01 parts by weight of UV3570 was used instead of 0.5 parts by weight of UV3500 as the photoreactive siloxane additive. Using the prepared adhesive composition, a surface protective film was fabricated.

Example 5

An adhesive composition was prepared in the same manner as in Example 1, except that 0.2 parts by weight of Tego2500 was used instead of 0.5 parts by weight of UV3500 as the photoreactive siloxane additive. Using the prepared adhesive composition, a surface protective film was fabricated.

Example 6

An adhesive composition was prepared in the same manner as in Example 1, except that 0.2 parts by weight of Tego2010 was used instead of 0.5 parts by weight of UV3500 as the photoreactive siloxane additive. Using the prepared adhesive composition, a surface protective film was fabricated.

Comparative Example 1

An adhesive composition was prepared in the same manner as in Example 1, except that the photoreactive siloxane additive was not added. Using the prepared adhesive composition, a surface protective film was fabricated.

Comparative Example 2

An adhesive composition was prepared in the same manner as in Example 1, except that 0.2 parts by weight of BYK307 having no acrylate reactive group was used instead of 0.5 parts by weight of UV3500 as the photoreactive siloxane additive. Using the prepared adhesive composition, a surface protective film was fabricated.

Comparative Example 3

An adhesive composition was prepared in the same manner as in Example 1, except that 0.4 parts by weight of BYK377 having no acrylate reactive group was used instead of 0.5 parts by weight of UV3500 as the photoreactive siloxane additive. Using the prepared adhesive composition, a surface protective film was fabricated.

Comparative Example 4

An adhesive composition was prepared in the same manner as in Example 1, except that 1.5 parts by weight of UV3500 was used instead of 0.5 parts by weight of UV3500 as the photoreactive siloxane additive. Using the prepared adhesive composition, a surface protective film was fabricated.

Experimental Examples

The physical properties of the surface protective films of the Examples and the Comparative Examples were evaluated by the following methods, and the results of the evaluation are shown in Table 1 below.

Experimental Example 1: Evaluation of Peel Strength

Each of the surface protective films of Examples 1 to 6 and Comparative Examples 1 to 4 was cut to a size of 25 mm in width and 150 mm in length, and then the adhesive layer of each of the cut surface protective films was attached to a glass substrate by means of a 2-kg roller, followed by storage at a temperature of 25° C. for 24 hours. Next, the peel strength was measured when each of the surface protective films was peeled from the glass substrate at a peel rate of 1.8 m/min and a peel angle of 180° using a Texture Analyzer (Stable Micro System, UK).

Experimental Example 2: Evaluation of Adhesive Strength Retention Rate

Each of the surface protective films of Examples 1 to 6 and Comparative Examples 1 to 4 was cut to a size of 25 mm in width and 150 mm in length, and then the adhesive layer of each of the cut surface protective films was attached to a glass substrate by means of a 2-kg roller, followed by storage in an oven (DZF6090) at a temperature of 60° C. and a humidity of 90 RH % for 10 days. Next, the peel strength of each surface protective film was measured. Thereafter, the adhesive strength retention rate (%) of each surface protective film was calculated according to the following Equation 1 from the peel strength measured in Experimental Example 1 and the peel strength measured in Experimental Example 2.

Adhesive strength retention rate (%)=(peel strength measured in Experimental Example 2/peel strength measured in Experimental Example 1)×100 [Equation 1]

TABLE 1

|  | Example | | | | | | Comparative Example | | | |
| --- | --- | --- | --- | --- | --- | --- | --- | --- | --- | --- |
|  | 1 | 2 | 3 | 4 | 5 | 6 | 1 | 2 | 3 | 4 |
| Peel strength (gf/inch) | 2.3 | 2.8 | 3.2 | 3.9 | 3.5 | 3.9 | 4.5 | 2.1 | 1.9 | 1.9 |
| Adhesive strength retention rate (%) | 77 | 82 | 85 | 90 | 86 | 88 | 91 | 64 | 60 | 52 |

Referring to Table 1 above, it was confirmed that, when the photoreactive siloxane additive containing an acrylate reactive group was used, the peel strength was decreased to 4.0 gf/inch or less, and the adhesive strength retention rate was 75% or more.

In contrast, it was confirmed that, in the case of Comparative Example 1 in which the photoreactive siloxane additive was not used, the peel strength increased rapidly, leading to degradation in the workability of the surface protective film. It was confirmed that, in the case of Comparative Example 4 in which the content of the photoreactive siloxane additive was excessively high, the peel strength was decreased, but the adhesive strength retention rate was low, and thus the adhesive layer left residue on the adherend after peeling. Likewise, it was confirmed that, in the case of Comparative Examples 2 and 3 in which the siloxane additive containing no acrylate reactive group was used, the peel strength was decreased, but the adhesive strength retention rate was low, and thus the adhesive layer left residue on the adherend after peeling.

Therefore, according to one embodiment of the present disclosure, the peel strength and adhesive strength retention rate of the surface protective film may be adjusted by providing the photoreactive siloxane additive having an acrylate reactive group in the adhesive composition and adjusting the content of the photoreactive siloxane additive, whereby the workability of the surface protective film may be improved.

Although the present disclosure has been described above with reference to the limited embodiment, the present disclosure is not limited thereto, and various modifications and alterations may be made by those skilled in the art without departing from the technical spirit of the present disclosure and equivalents to the appended claims.

The invention claimed is:

1. A surface protective film comprising an adhesive layer provided on one surface of a substrate layer,
wherein the adhesive layer comprises a cured product of an adhesive composition containing: a urethane-based resin having a photoreactive group at an end or side chain thereof; a monofunctional (meth)acrylate monomer; a crosslinking agent having two or more photoreactive groups at an end thereof; a photoinitiator; and a photoreactive siloxane additive, the adhesive composition being solvent-free,
wherein the monofunctional (meth)acrylate monomer is contained in an amount of 50 parts by weight to 200 parts by weight based on 100 parts by weight of the urethane-based resin.

2. The surface protective film of claim 1, wherein the adhesive layer has a peel strength of 0.5 gf/in to 4 gf/in, as measured on a glass substrate at a peel angle of 180° and a peel rate of 1.8 m/min, and an adhesive strength retention rate of the adhesive layer is 75% or more.

3. The surface protective film of claim 1, wherein the photoreactive siloxane additive is of a solvent-free type and contains an acrylate reactive group.

4. The surface protective film of claim 1, wherein the photoreactive siloxane additive is present in an amount of 0.01 parts by weight to 1 part by weight based on 100 parts by weight of the urethane-based resin.

5. The surface protective film of claim 1, wherein the urethane-based resin is obtained by reacting a polyol and an isocyanate-based curing agent.

6. The surface protective film of claim 5, wherein the polyol is selected from the group consisting of: ethylene glycol, diethylene glycol, polypropylene glycol, and combinations thereof.

7. The surface protective film of claim 5, wherein the isocyanate-based curing agent is selected from the group consisting of: a polyfunctional aliphatic isocyanate compound, a polyfunctional alicyclic isocyanate compound, a polyfunctional aromatic isocyanate compound, and combinations thereof.

8. The surface protective film of claim 1, wherein the crosslinking agent having two or more photoreactive groups at the end thereof is selected from the group consisting of: a polyfunctional (meth)acrylate monomer, a polyfunctional urethane (meth)acrylate oligomer, and a mixture thereof.

9. The surface protective film of claim 1, wherein the crosslinking agent having two or more photoreactive groups at the end thereof is present in an amount of 5 parts by weight to 50 parts by weight, based on 100 parts by weight of the urethane-based resin.

10. The surface protective film of claim 1, wherein the photoinitiator is present in an amount of 0.1 parts by weight to 5 parts by weight, based on 100 parts by weight of the total sum of the urethane-based resin, the crosslinking agent and the photoreactive siloxane additive.

11. The surface protective film of claim 1, wherein the adhesive layer has a thickness of 10 μm to 100 μm.

12. The surface protective film of claim 1, wherein the adhesive layer further comprises an antistatic agent.

13. The surface protective film of claim 1, wherein
the substrate layer comprises: a substrate film; a first antistatic layer and a second antistatic layer provided on both surfaces of the substrate film, respectively, and the adhesive layer is provided on a surface of the second antistatic layer, which is opposite to a surface thereof on which the substrate film is provided.

* * * * *